United States Patent [19]

Hasenbein et al.

[11] Patent Number: 5,189,120
[45] Date of Patent: Feb. 23, 1993

[54] PEROXIDE-FREE GRAFTING OF HOMOPOLYMERS AND COPOLYMERS OF ETHYLENE HAVING DENSITIES LESS THAN 0.930 G/CM³, AND USE OF THE GRAFT COPOLYMERS FOR THE PREPARATION OF IONOMERS OR ADHESION PROMOTERS

[75] Inventors: Norbert Hasenbein, Dirmstein; Peter Bauer, Ludwigshafen; Lothar Schlemmer, Maxdorf; Alfred F. Hauss; Hans Gropper, both of Ludwigshafen; Rainer Ohlinger, Heidelberg, all of Fed. Rep. of Germany

[73] Assignee: BASF Aktiengesellschaft, Ludwigshafen, Fed. Rep. of Germany

[21] Appl. No.: 605,002

[22] Filed: Oct. 30, 1990

Related U.S. Application Data

[63] Continuation of Ser. No. 384,906, Jul. 25, 1989, abandoned, which is a continuation of Ser. No. 117,295, Nov. 6, 1987, abandoned.

[30] Foreign Application Priority Data

Nov. 20, 1986 [DE] Fed. Rep. of Germany ....... 3639566

[51] Int. Cl.⁵ ............................................. C08F 267/04
[52] U.S. Cl. ..................................... 525/285; 525/301
[58] Field of Search ................................ 525/285, 301

[56] References Cited

U.S. PATENT DOCUMENTS

| | | | |
|---|---|---|---|
| 3,264,272 | 8/1966 | Rees | 260/78.5 |
| 3,270,090 | 8/1966 | Nowak | 525/301 |
| 3,658,948 | 4/1972 | McConnell et al. | 260/897 R |
| 3,708,555 | 1/1973 | Gaylord | 525/285 |
| 3,884,882 | 5/1975 | Caywood | 525/285 |
| 4,026,967 | 5/1977 | Flexman | 525/285 |
| 4,147,740 | 4/1979 | Swiger et al. | |
| 4,206,155 | 6/1980 | Korber | 525/301 |
| 4,230,830 | 10/1980 | Tanny | 525/222 |
| 4,487,885 | 12/1984 | Adur et al. | 525/74 |
| 4,548,993 | 10/1985 | Garagnani | 525/293 |
| 4,619,972 | 10/1986 | Inoue | 525/301 |
| 4,795,782 | 1/1989 | Lutz | 525/66 |

FOREIGN PATENT DOCUMENTS

| | | | |
|---|---|---|---|
| 1299120 | 7/1969 | Fed. Rep. of Germany | 525/285 |
| 1322448 | 2/1963 | France . | |
| 1393730 | 2/1965 | France . | |
| 2550656 | 2/1985 | France . | |
| 53-82880 | 7/1978 | Japan . | |
| 59-068319A | 4/1984 | Japan | 525/285 |
| 946384 | 1/1964 | United Kingdom . | |

OTHER PUBLICATIONS

Chemical Abstract 180,990s, vol. 89, p. 44 (1978).
European Search Report.

*Primary Examiner*—Joseph L. Schofer
*Assistant Examiner*—Alex H. Walker
*Attorney, Agent, or Firm*—Keil & Weinkauf

[57] ABSTRACT

In a process for the peroxide-free grafting of ethylenically unsaturated carboxylic acids, carboxylic anhydrides and/or their derivatives to a homopolymer or copolymer of ethylene having a density less than 0.930 g/cm³, the monomers to be grafted are used in a concentration of from 0.01 to 0.5% by weight and the grafting reaction is carried out at from 210° to 300° C. in a conventional extruder or mixer in the absence of a free radical initiator. The graft copolymers are used for the preparation of ionomers and adhesion promoters.

4 Claims, No Drawings

PEROXIDE-FREE GRAFTING OF HOMOPOLYMERS AND COPOLYMERS OF ETHYLENE HAVING DENSITIES LESS THAN 0.930 G/CM³, AND USE OF THE GRAFT COPOLYMERS FOR THE PREPARATION OF IONOMERS OR ADHESION PROMOTERS

This application is a continuation of application Ser. No. 384,906, filed on Jul. 25, 1989, now abandoned which is a continuation of Ser. No. 117,295 filed on Nov. 6, 1987 now abandoned.

The present invention relates to a process for the peroxide-free grafting of ethylenically unsaturated carboxylic acids, carboxylic anhydrides and/or their derivatives onto ethylene polymers having densities less than 0.930 g/cm³.

Graft copolymers can be prepared by reacting the base materials with peroxides or subjecting them to high mechanical loads, producing free radicals in this way and bringing them into contact with suitable monomers. According to British Patent 679,562, the free radicals can be produced by means of high speed stirrers, shaking, milling, kneading, ultrasonic vibrations or passage through filters or capillary tubes at high linear velocities. This results in degradation of the polymer the formation of reactive radicals, at which the graft reaction can take place. When the graft reaction is carried out in a Diskback screwless extruder using polyethylene as a base polymer and maleic anhydride as the monomer to be grafted [cf. Protassow et al., Plaste und Kautschuk 23 (3) (1976), 185-187], crosslinking reaction are observed.

According to the same publication, the lack of initiators results in no reaction at all taking place if a conventional extruder is to be used for the reaction.

However, grafting can also be carried out in conventional extruders if suitable initiators, such as organic peroxides, are added to the reaction mixture and the reaction is carried out in a special reaction zone, for example that described in U.S. Pat. Nos. 3,862,265, 3,953,655 and 4,001,172. In this process too, however, polymer degradation takes place and, in the case of polyethylene as the base polymer, there is furthermore a danger of crosslinking.

In order to prevent degradation of the polymer, special process engineering measures are necessary, as described in U.S. Pat. Nos. 3,177,269, 3,177,270 and 3,270,090.

If maleic anhydride is used as the unsaturated compound to be grafted, in a concentration of 0.051-1.26% by weight, based on the base polymer polyethylene, according to U.S. Pat. No. 4,147,740 virtually complete conversion of the maleic anhydride takes place. Complete conversion of the maleic anhydride is particularly advantageous, owing to the high toxicity of the free unbound maleic anhydride.

According to U.S. Pat. No. 4,147,740, an important precondition for the complete incorporation of maleic anhydride is the use of peroxides; in particular, the lower the maleic anhydride concentration, the greater must be the ratio of peroxide concentration to the maleic anhydride concentration. At a maleic anhydride concentration of 1.26% by weight, based on the base polymer, a peroxide concentration which is about one tenth of the maleic anhydride concentration is still sufficient; at low maleic anhydride concentrations, the use of a peroxide concentration corresponding to the maleic anhydride concentration is still insufficient for achieving complete conversion of the maleic anhydride. This is achieved only with a five-fold peroxide excess.

The use of such high peroxide concentrations leads to undesirable crosslinking, which reduces the flow and processability of the graft polymers. The undesirable degradation and crosslinking reactions due to the use of peroxide can frequently be suppressed only by special process engineering measures, as described in, for example, U.S. Pat. Nos. 3,177,269, 3,177,270 and 3,270,090. These restrict the flexibility of the process.

Furthermore, the use of peroxide has an adverse effect on the color and odor of the polymers. In addition, the adhesion to polar substances, for example metals, decreases. Finally, the use of peroxides is in principle unacceptable from a safety point of view.

According to the prior art, however, the use of peroxides is absolutely essential for obtaining any graft reaction at all. Precisely at low maleic anhydride concentrations, which are within a range of industrial interest, relatively high peroxide concentrations are required in order to achieve complete conversion of the maleic anhydride. However, complete maleic anhydride conversions are desirable for economic reasons and even more so for reasons relating to occupational hygiene, owing to the high toxicity of the maleic anhydride.

If, on the other hand, free radicals are produced by a purely thermal method, i.e. without the use of peroxide, degradation reactions take place which reduce the viscosity of the base polymers. These degraded polymers exhibit poor adhesion to metals, even when the polymers are grafted with maleic anhydride, using the thermally produced free radicals.

If the free radicals required for the graft reaction are produced mechanochemically, for example in a Diskpack screwless extruder, the base polymer is likewise considerably degraded; in addition, crosslinking reactions may also occur in the presence of maleic anhydride.

It is an object of the present invention to provide a process for the peroxide-free grafting of unsaturated carboxylic acids, anhydrides and their derivatives, in which no degradation and no crosslinking of the ethylene polymer takes place. At the same time, the conversion of the monomers should be as complete as possible.

We have found that these objects are achieved by processes according to claims 1 to 4.

Particularly suitable ethylenically unsaturated carboxylic acids, carboxylic anhydrides and/or their derivatives are the conventional compounds such as maleic acid, fumaric acid, itaconic acid, acrylic acid, acrylic anhydride, methacrylic acid, crotonic acid, maleic anhydride and itaconic anhydride. Preferred compounds are maleic acid, fumaric acid and in particular maleic anhydride.

For the purposes of the present invention, homopolymers and copolymers of ethylene having densities less than 0.930 g/cm³ are, in particular, low density polyethylene (LDPE), low density ethylene/vinyl acetate copolymers, low density ethylene/acrylate copolymers and linear low density polyethylene (LLDPE). The densities were determined according to DIN 53,479; they are preferably from 0.930 to 0.966, in particular from 0.914 to 0.928, g/cm³.

In the novel process, the monomers to be grafted are used in concentrations of from 0.01 to 0.5% by weight, based on the ethylene polymer, and mixed with the ethylene polymer which has been melted at 140° C. or higher, and the graft reaction is carried out at from 210° to 300° C., for example in a conventional extruder under from 1 to 500 bar, in the absence of a free radical initiator.

Grafting is preferably carried out at a concentration of from 0.05 to 0.25, in particular from 0.05 to 0.20, % by weight. The temperature is preferably from 210° to 280° C., in particular from 210° to 260° C.

In another preferred process, the monomer to be grafted is admixed in the liquid state.

Peroxide-free grafting of the unsaturated carboxylic acid, anhydrides and their derivatives was carried out in a conventional twin-screw extruder, for example ZDSK 53 from Werner & Pfleiderer. However, other reactors known from the prior art, for example a Brabender reactor, may also be used. The ethylene polymer and, if required, also the monomer to be grafted were melted at 140° C. or higher, mixed thoroughly and then reacted at elevated temperatures, i.e. from 210° to 300° C., preferably from 210° to 280° C., particularly preferably from 210° to 260° C. In this procedure, it is unimportant whether the monomer to be grafted is introduced into the reactor before or after the ethylene polymer is melted. The monomers to be grafted were used in a concentration of from 0.01 to 0.5, preferably from 0.05 to 0.25, % by weight, based on the ethylene polymer. It was found that the yields of grafted monomer were higher the lower the concentrations of the monomers to be grafted. This finding is surprising since, according to U.S. Pat. No. 4,147,740, it is supposed to be more difficult to achieve high grafting yields the lower the concentration of monomers to be grafted. This shows that the reaction which forms the basis of this invention is completely different from graft reactions carried out using peroxide. In a preferred procedure, the monomer to be grafted is mixed with the ethylene polymer in the liquid state. For this purpose, it may be melted beforehand.

The novel process on the one hand ensures a high conversion of the monomer to be grafted and on the other hand leads to neither significant crosslinking nor degradation of the base polymer.

The graft copolymers prepared according to the invention are suitable for the production of hollow articles, coating and coextrusion, powder coating, etc. Because of their low residual monomer content, they are also useful for the food sector.

The products have good adhesion to nylon, polyvinyl alcohol, polystyrene, polycarbonate, polyolefins, epoxy resins and metals, e.g. aluminum and iron.

The adhesion of these graft copolymers prepared without the use of peroxide is higher than that of products grafted with the use of peroxide. In the case of the products prepared according to the invention, the flow is scarcely reduced in comparison with the base polymer. In contrast to the graft copolymers prepared with the use of peroxide, the products prepared without the use of peroxide can readily be processed. The films obtained from these products have a substantially lower speck content than films obtained from graft products prepared with the use of peroxide. The products obtained from the peroxide-free graft reaction are furthermore completely colorless and odorless.

The use of similar graft copolymers which consist of ethylene polymers and grafted unsaturated carboxylic acids or carboxylic anhydrides for the preparation of adhesion promoters and adhesives is known per se and described in, for example, British Patent 2,081,723 and U.S. Pat. No. 4,487,885. Furthermore, the use of similar graft copolymers for the preparation of ionomers is so well known from the literature that further description at this point is superfluous (cf. for example U.S. Pat. Nos. 3,264,272 or 3,437,718). In the preparation of the ionomers, the free carboxyl groups of the graft copolymer obtained according to the invention are reacted with organic bases or salts to give the corresponding salts. Alkali metal compounds and salts of the alkali metals, of the alkaline earth metals or of zinc with organic acids are particularly suitable.

EXAMPLE 1

100 parts by weight of LLDPE (copolymer of 93% by weight of ethylene and 7% by weight of butene; melt flow index=4.5 g/10 min, determined in all experiments according to ASTM-D-1238-65T at 190° C. and under a load of 2.16 kg; density=0.920 g/cm$^3$, determined in all experiments according to DIN 53,479) were melted at 140° C. in a ZDSK 53 twin-screw extruder from Werner & Pfleiderer. 0.25 part by weight of liquid maleic anhydride was pumped into the melt and mixed with the base polymer, and the reaction was carried out at 260° C. Unconverted maleic anhydride was removed from the polymer melt by devolatilization under reduced pressure.

The mean residence time of the grafting components in the extruder was 2 minutes, and the polymer throughput was 10 kg/h at 150 rpm.

The yield of grafted maleic anhydride was 96%. The grafted polymer (melt flow index=4.0 g/10 min) had improved adhesion to polar substances, such as epoxy resins or metals, and was furthermore completely colorless and odorless.

EXAMPLE 2

100 parts by weight of V 2910 k (ethylene/vinyl acetate copolymer from BASF; melt flow index=4.3 g/10 min, density=0.928 g/cm$^3$) were melted at 140° C. in a ZDSK 53 twin-screw extruder from Werner & Pfleiderer. 0.25 part by weight of liquid maleic anhydride was pumped into the melt and mixed with the base polymer, and the reaction was carried out at 220° C. Unconverted maleic anhydride was removed from the polymer melt by devolatilization under reduced pressure.

The mean residence time of the grafting components in the extruder was 2 minutes, and the polymer throughput was 10 kg/h at 150 rpm.

The yield of grafted maleic anhydride was 92%. The grafted polymer (melt flow index=3.0 g/10 min) had improved adhesion to polar substances, such as epoxy resins or metals, and was furthermore completely colorless and odorless.

EXAMPLE 3

100 parts by weight of V 2910 k (ethylene/vinyl acetate copolymer from BASF; melt flow index=4.3 g/10 min, density=0.928 g/cm$^3$, were melted at 140° C. in a ZDSK 53 twin-screw extruder from Werner & Pfleiderer. 0.25 part by weight of liquid maleic anhydride was pumped into the melt and mixed with the ethylene polymer, and the reaction was carried out at 260° C. Unconverted maleic anhydride was removed from the polymer melt by devolatilization under reduced pressure.

The mean residence time of the grafting components in the extruder was 2 minutes, and the polymer throughput was 10 kg/h at 150 rpm.

The yield of grafted maleic anhydride was 98%. The grafted polymer (melt flow index=3.0 g/10 min) had improved adhesion to polar substances, such as epoxy resins or metals, and was furthermore completely colorless and odorless.

EXAMPLE 4

100 parts by weight of LLDPE (copolymer of 93% by weight of ethylene and 7% by weight of butene; melt flow index=4.5 g/10 min, density=0.920 g/cm$^3$, were melted at 140° C. in a ZDSK 53 twin-screw extruder from Werner & Pfleiderer. 0.05 part by weight of liquid maleic anhydride was pumped into the melt and mixed with the base polymer, and the reaction was carried out at 240° C.

Unconverted maleic anhydride was removed from the polymer melt by devolatilization under reduced pressure.

The mean residence time of the grafting components in the extruder was 2 minutes, and the polymer throughput was 10 kg/h at 150 rpm.

The yield of grafted maleic anhydride was 98%. The grafted polymer (melt flow index=4.0 g/10 min) had improved adhesion to polar substances, such as epoxy resins or metals, and was furthermore completely colorless and odorless.

EXAMPLE 5 AND COMPARATIVE EXPERIMENT

Polyethylene was grafted with maleic anhydride under the same conditions as in Example 1, except that the maleic anhydride was mixed with 0.025 part by weight of dicumyl peroxide. The resulting products were pressed to give 2.7 mm thick iron/epoxy resin adhesion promoter/polyethylene laminated sheets, and the peeling strength was determined by a test based on DIN 30,670. Table 1 shows that the product grafted without peroxide (Example 5) has very much higher adhesion than the product grafted with the use of peroxide (Comparative Experiment).

TABLE 1

|  | Dicumyl peroxide [% by wt.] | Yield of grafted maleic anhydride [% by wt.] | Product melt flow index 2.16 [g/10 min] | Adhesion laminated sheet N/2 cm strip width | Color | Odor |
| --- | --- | --- | --- | --- | --- | --- |
| Comparative Experiment | 0.025 | 95 | 1.6 | 60 | Yellow | Strongly of decomposition products of the peroxide |
| Example 5 | — | 96 | 4.0 | 170 | Colorless | None |

The product obtained in the Comparative Experiment is difficult to process (great reduction in the melt flow index), is yellow and smells strongly of the decomposition products of the peroxide. Films produced from this product have a high speck content. Products obtained according to Example 5 do not have these disadvantages.

EXAMPLE 6 AND COMPARATIVE EXPERIMENTS

The polyethylene was grafted with maleic anhydride under the same conditions as in Example 2, except that 0.4, 0.75 or 1.25 parts by weight of maleic anhydride were used for grafting. Table 2 shows that the grafting yields become poorer with increasing maleic anhydride concentration.

TABLE 2

|  | Maleic anhydride concentration used [% by weight] | Product melt flow index 2.16 [g/10 min] | Yield of grafted maleic anhydride [%] |
| --- | --- | --- | --- |
| Experiment A | 0.4 | 2.5 | 65 |
| Comparative Experiment B | 0.75 | 2.8 | 50 |
| Comparative Experiment C | 1.25 | 3.0 | 32 |
| Example 6 | 0.25 | 3.0 | 92 |

However, poor yields of maleic anhydride are undesirable for economic reasons as well as reasons relating to occupational hygiene.

EXAMPLE 7 AND COMPARATIVE EXPERIMENTS

The polyethylene was grafted with maleic anhydride under the same conditions as in Example 6, except that the reaction was carried out at 280° C. Table 2 shows that the grafting yields become poorer with increasing maleic anhydride concentration.

TABLE 3

|  | Maleic anhydride concentration used [% by weight] | Product melt flow index 2.16 [g/10 min] | Yield of grafted maleic anhydride [%] |
| --- | --- | --- | --- |
| Comparative Experiment A | 0.4 | 1.9 | 78 |
| Comparative Experiment B | 0.75 | 2.0 | 60 |
| Comparative Experiment C | 1.25 | 2.1 | 50 |
| Example 6 | 0.25 | 2.0 | 99 |

However, poor yields of maleic anhydride are undesirable for economic reasons as well as reasons relating to occupational hygiene.

We claim:

1. A process for grafting monomeric compounds selected from the group consisting of ethylenically unsaturated carboxylic acids having from 3 to 6 carbon atoms and anhydrides thereof onto a saturated homopolymer or copolymer of ethylene having a density less than 0.930 g/cm$^3$ in a conventional extruder under from 1 to 500 bar in the absence of a free radical catalyst or any other graft-initiating additive, wherein the monomer to be grafted is mixed, in a concentration of from 0.01 to 0.20% by weight, based on the ethylene polymer, with the ethylene polymer which has been melted at 140° C. or higher, and wherein the grafting reaction is carried out at a temperature of from 210° to 300° C. and the monomer is essentially completely converted to grafted polymer product.

2. A process as claimed in claim 1, wherein the graft monomer is admixed in the liquid state.

3. A process as claimed in claim 1, wherein the concentration of the graft monomer is from 0.05 to 0.25% by weight.

4. A process as claimed in claim 1, wherein the graft monomer is maleic anhydride.

* * * * *